(12) United States Patent
Shim et al.

(10) Patent No.: US 11,065,940 B2
(45) Date of Patent: Jul. 20, 2021

(54) AIR CONDITIONER FOR VEHICLE

(71) Applicant: LG Electronics Inc., Seoul (KR)

(72) Inventors: Hyunmin Shim, Seoul (KR); Naehyun Park, Seoul (KR); Namgyu Shin, Seoul (KR); Keonwang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 427 days.

(21) Appl. No.: 16/049,533

(22) Filed: Jul. 30, 2018

(65) Prior Publication Data
US 2020/0023717 A1 Jan. 23, 2020

(30) Foreign Application Priority Data

Jul. 20, 2018 (KR) ........................ 10-2018-0084913

(51) Int. Cl.
| | | |
|---|---|---|
| *B03C 3/12* | (2006.01) | |
| *B03C 3/09* | (2006.01) | |
| *B03C 3/38* | (2006.01) | |
| *B03C 3/41* | (2006.01) | |
| *B03C 3/47* | (2006.01) | |
| *B03C 3/60* | (2006.01) | |
| *B60H 3/00* | (2006.01) | |

(52) U.S. Cl.
CPC ............. *B60H 3/0078* (2013.01); *B03C 3/09* (2013.01); *B03C 3/12* (2013.01); *B03C 3/38* (2013.01); *B03C 3/41* (2013.01); *B03C 3/47* (2013.01); *B03C 3/60* (2013.01); *B03C 2201/30* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,438,180 | A | * | 4/1969 | Klouda ................... | B03C 3/14 96/58 |
| 3,626,668 | A | * | 12/1971 | Cardiff ................... | B03C 3/155 96/58 |
| 3,735,560 | A | * | 5/1973 | Wellman .................. | B03C 3/38 96/62 |
| 3,836,135 | A | * | 9/1974 | Wightman ............... | B03C 3/86 269/43 |
| 4,290,788 | A | * | 9/1981 | Pittman .................... | B03C 3/66 55/481 |
| 5,290,343 | A | * | 3/1994 | Morita ..................... | B03C 3/86 96/39 |

(Continued)

FOREIGN PATENT DOCUMENTS

KR  10-2016-0015640  2/2016

*Primary Examiner* — Frank M Lawrence, Jr.
*Assistant Examiner* — Sonji Turner
(74) *Attorney, Agent, or Firm* — Fish & Richardson P.C.

(57) ABSTRACT

The present invention relates to an air conditioner for a vehicle. The air conditioner for a vehicle according to an embodiment of the present invention includes a main body and an electric dust collection assembly. The electric dust collection assembly includes an electrification apparatus for electrifying dust particles in the air and a collector for collecting dust particles electrified by the electrification apparatus and removing the dust particles from the air. At this time, the electrification apparatus and the collector are formed to be capable of being separated by a separate device.

18 Claims, 7 Drawing Sheets

(56) References Cited

U.S. PATENT DOCUMENTS

| | | | | |
|---|---|---|---|---|
| 5,433,772 | A * | 7/1995 | Sikora | B03C 3/32 |
| | | | | 422/120 |
| 5,456,741 | A * | 10/1995 | Takahara | B03C 3/12 |
| | | | | 95/6 |
| 5,622,543 | A * | 4/1997 | Yang | B03C 3/368 |
| | | | | 96/58 |
| 6,679,940 | B1 * | 1/2004 | Oda | A61L 9/22 |
| | | | | 96/55 |
| 7,332,019 | B2 * | 2/2008 | Bias | F24F 3/166 |
| | | | | 96/15 |
| 7,368,004 | B2 * | 5/2008 | Yamada | B03C 3/04 |
| | | | | 96/55 |
| 7,601,204 | B2 * | 10/2009 | Woodruff | B03C 3/017 |
| | | | | 95/73 |
| 9,308,537 | B2 * | 4/2016 | Krichtafovitch | B03C 3/09 |
| 9,610,589 | B2 * | 4/2017 | Siegfried | B03C 3/82 |
| 9,919,587 | B2 * | 3/2018 | Wennerstrom | F24F 3/166 |
| 10,384,517 | B2 * | 8/2019 | Jee | B03C 3/40 |
| 10,414,247 | B2 * | 9/2019 | Jee | B03C 3/41 |
| 10,464,074 | B2 * | 11/2019 | Lee | B03C 3/45 |
| 10,639,968 | B2 * | 5/2020 | Lofvendahl | B03C 3/45 |
| 10,668,422 | B2 * | 6/2020 | Kim | F24F 11/30 |
| 2009/0053113 | A1 * | 2/2009 | Mai | B03C 3/47 |
| | | | | 422/121 |
| 2017/0120181 | A1 * | 5/2017 | Jeon | F24F 13/28 |

* cited by examiner

AIR CONDITIONER FOR VEHICLE

CLAIM OF PRIORITY

This application claims priority to Korean Patent Application Serial No. 10-2018-0084913, filed on Jul. 20, 2018, the entire contents of which are hereby incorporated by reference.

BACKGROUND

The present invention relates to an air conditioner for a vehicle.

An air conditioner is a device for keeping the air in a predetermined space in a most suitable condition according to use and purpose. Generally, in the air conditioner, a compressor, a condenser, an expansion device, and an evaporator are provided, and a refrigeration cycle for compressing, condensing, expanding, and evaporating a refrigerant is driven to cool or heat the predetermined space.

The predetermined space may be variously proposed according to the place where the air conditioner is used. For example, in a case where the air conditioner is installed in a home or an office, the predetermined space may be an indoor space of a house or a building.

In addition, the predetermined space may correspond to the interior of a vehicle. Accordingly, the air conditioner for cooling or heating the interior of the vehicle can be classified as an air conditioner for a vehicle.

At this time, the air conditioner or the air conditioner for a vehicle may include an electric dust collector for electrifying and collecting dust particles in the air. In addition, the electric dust collector may be installed in a product other than the air conditioner, or the like, and for example, the electric dust collector may be installed in an air cleaner, a humidifier, or the like. In addition, the electric dust collector can be independently installed in the air to remove dust in the air.

At this time, the following prior art relating to an electric dust collector installed in the air conditioner for a vehicle has been filed and disclosed.
<Related Art 1>
1. Korea patent publication number: 10-2016-0015640 (publication date: Feb. 15, 2016)
2. Title of Invention: Electric dust collector for vehicle As described in the above-mentioned related art 1, the electric dust collector is mounted on the vehicle air conditioner in a state where the filter unit and the electrification unit are integrally formed with each other. In addition, the electrification unit includes an electrification plate having a plurality of circular through-holes and an electrification pin installed on the center of the through-hole. Dust particles passing through the electrification plate and the electrification pin are electrified and collected in the filter unit.

The related art 1 has the following problems.

(1) Compared with the filter unit in which electrified dust particles are collected, an electrification unit for electrifying dust particles has relatively long replacement and cleaning cycles or can be used semi-permanently. At this time, since the filter unit and the electrification unit are formed integrally, it is impossible to replace or clean the filter unit and the electrification unit, individually.

(2) In addition, in order to replace and clean the filter unit, there is a problem that all of the electric dust collectors including the electrification unit have to be separated from the air conditioner for a vehicle.

SUMMARY

In order to solve such a problem, the objective of the present embodiment is to propose an air conditioner for a vehicle which includes an electrification apparatus for electric dust collection which electrifies dust particles in the air and a collector for electric dust collection which collects the electrified dust particles, separately.

In addition, an objective of the present invention is to provide an air conditioner for a vehicle in which spaces for installing the electrification apparatus for electric dust collection and the collector for electric dust collection are divided.

The air conditioner for a vehicle according to the teachings of the present invention includes a main body in which a suction port and a discharge port are formed, and an electric dust collection assembly installed inside the main body so as to remove dust particles and the like from the air introduced into the suction port. The electric dust collection assembly includes an electrification apparatus for electrifying dust particles in the air and a collector for collecting dust particles electrified by the electrification apparatus and removing the dust particles from the air. At this time, the electrification apparatus and the collector are formed to be capable of being separated by a separate device.

Meanwhile, the air conditioner for a vehicle according to the teachings of the present invention includes a main body in which a suction port and a discharge port are formed, and an electric dust collection assembly installed inside the main body so as to remove dust particles from the air introduced into the suction port. The electric dust collection assembly includes an electrification apparatus for electrifying dust particles in the air and a collector for collecting dust particles or the like electrified by the electrification apparatus and removing the dust particles from the air.

In addition, the main body is provided with a dust collection installation portion in which the electrification apparatus and the collector are installed.

At this time, the dust collection installation portion may include a first installation hole into which the electrification apparatus is inserted and a second installation hole into which the collector is inserted.

According to the proposed embodiment, the electrification apparatus for electric dust collection and the collector for electric dust collection can be separated into separate devices and installed in the air conditioner for a vehicle. Accordingly, each device can be more easily managed, and each device can be managed separately.

Particularly, the replacement cycle and the cleaning cycle of the electrification apparatus and the collector are different from each other. Accordingly, since only the device requiring replacement or cleaning can be separated from the air conditioner for a vehicle, there is an advantage that convenience to the user can be provided.

In addition, the electrification apparatus and the collector are installed separately in the air conditioner for a vehicle. Accordingly, there is an advantage that each device can be inserted into or separated from the dust collection installation portion more conveniently.

DETAILED DESCRIPTION OF THE EMBODIMENTS

Hereinafter, some embodiments of the present invention will be described in detail with reference to exemplary drawings. It is to be noted that, in adding reference numerals to the constituent elements of the drawings, the same constituent elements are denoted by the same reference numerals whenever possible, even if the same constituent elements are illustrated in different drawings. In addition, in the following description of the embodiments of the present invention, a detailed description of known functions or configurations incorporated herein will be omitted in a case where it is determined that the detailed description thereof hinders understanding of the embodiment of the present invention.

In addition, in describing the constituent elements of the embodiment of the present invention, terms such as first, second, A, B, (a), and (b) may be used. These terms are intended to distinguish the constituent elements from other constituent elements, and the terms do not limit the nature, order or sequence of the constituent elements. In a case where a constituent element is described as being "connected", "coupled", or "accessed" to another constituent element, although the constituent element may be directly connected or accessed to the other constituent element, it should be understood that another constituent element may be "connected", "coupled", or "accessed" between the respective constituent elements.

Figure 1:
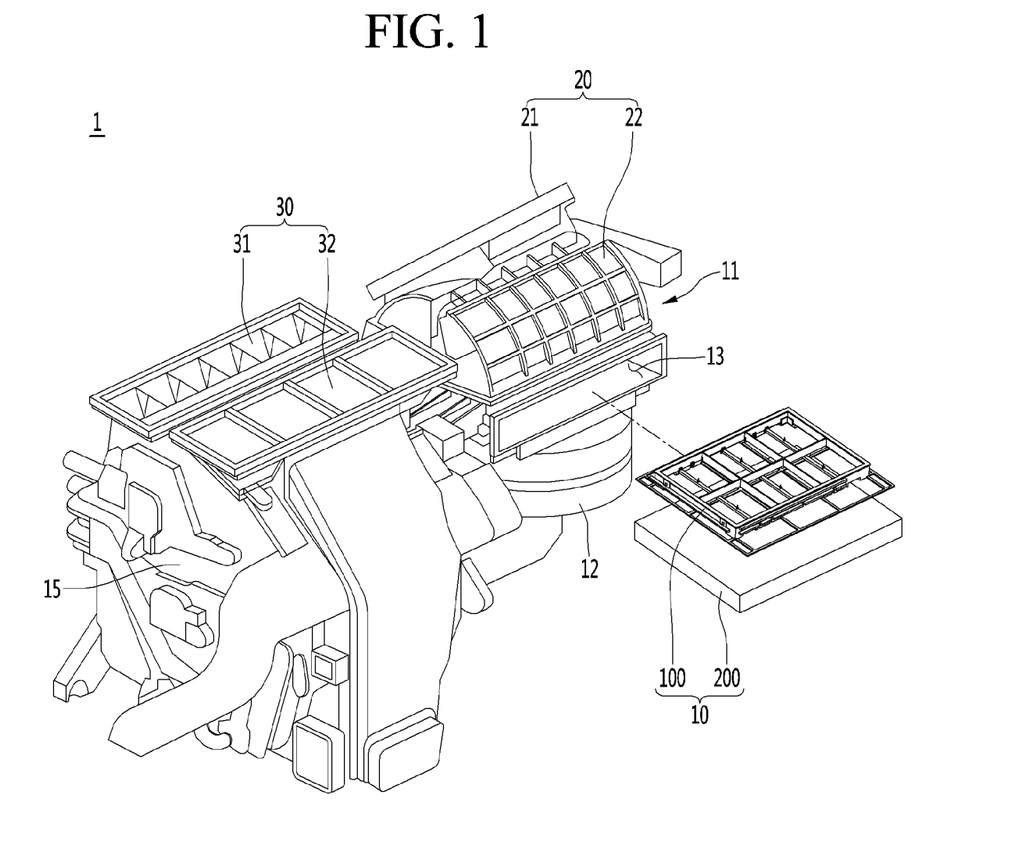
FIG. 1 is a view illustrating an air conditioner for a vehicle and an electric dust collection assembly installed therein according to a first embodiment of the present invention.

FIG. 1 is a view illustrating an air conditioner for a vehicle and an electric dust collection assembly installed therein according to a first embodiment of the present invention.

As illustrated in FIG. 1, the air conditioner 1 for a vehicle according to the teachings of the present invention includes a main body 11, 15 which forms an outer appearance. The main body may be divided into a suction main body 11 on which the suction port 20 is formed and a discharge main body 15 in which the discharge port 30 is formed.

The suction main body 11 and the discharge main body 15 are connected to each other to allow air to flow. Specifically, The suction main body 11 and the discharge main body 15 are connected to each other so that air flows from the suction main body 11 to the discharge main body 15. However, this is an example, and the air conditioner 1 for a vehicle may be provided as an integral main body.

A plurality of the suction port 20 and a plurality of the discharge port 30 may be formed in the suction main body 11 and the discharge main body 15, respectively.

The suction port 20 includes an indoor suction port 21 and an outdoor suction port 22. The indoor suction port 21 is understood as an opening through which the air inside the vehicle provided with the air conditioner 1 for a vehicle flows into the inside of the main body 11. In addition, it is to be understood that the outdoor suction port 22 is an opening through which the outside air of the vehicle flows into the inside of the main body 11.

The discharge port 30 includes a front discharge port 31 and a defrost discharge port 32. The front discharge port 31 is understood as an opening through which the air discharged from the main body 11 flows into the inside of the vehicle. In addition, the defrost discharge port 32 is understood as an opening through which the air discharged from the main body 11 flows into the windshield of the vehicle. Through the defrost discharge port, it is possible to remove frost formed in the windshield of the vehicle.

This is an example, and the suction port 20 and the discharge port 30 may be formed in various positions and numbers. For example, the discharge port 30 may further include a discharge port that discharges air to the lower side of the vehicle or a discharge port that discharges air to the rear side of the vehicle.

In addition, the air conditioner 1 for a vehicle includes a fan and a heat exchanger installed inside the main bodies 11 and 15 but is omitted in FIG. 1 for the convenience of illustration.

Specifically, a fan may be installed inside the suction main body 11. In other words, the fan can be disposed adjacent to the suction port 20. As the fan is driven, air flows into the suction main body 11 through the suction port 20. Then, air can flow from the suction main body 11 to the discharge main body 15.

A heat exchanger or a heater may be disposed in the discharge main body 15. Accordingly, the air flowing into the discharge main body 15 passes through the heat exchanger or the like and can be cooled or heated and may be discharged to the inside of the vehicle through the discharge port 30.

In addition, the air conditioner 1 for a vehicle may further include a plurality of suction ports 20 and a damper (not illustrated) for selectively opening the discharge ports 30. For example, the damper may open any one of the indoor suction port 21 and the outdoor suction port 22 and close the other. In addition, the damper may open at least one of the plurality of discharge ports 30.

In addition, in the air conditioner 1 for a vehicle according to the teachings of the present invention, an electric dust collection assembly 10 is installed. The electric dust collection assembly 10 corresponds to a configuration in which dust particles or the like in the air flowing into the air conditioner 1 for a vehicle are electrified and collected.

At this time, the electric dust collection assembly 10 may be installed in another product other than the air conditioner 1 for a vehicle. Accordingly, FIG. 1 corresponds to an example in which the electric dust collection assembly 10 is installed. In addition, the electric dust collection assembly 10 may be installed in an independent product (for example, an air purifier) to remove dust particles in the air.

The electric dust collection assembly 10 includes an electrification apparatus 100 for electric dust collection (hereinafter, electrification apparatus) and a collector 200 for electric dust collection (hereinafter, collector).

The electrification apparatus 100 functions to electrify foreign matters such as dust particles in the air. The collector 200 functions to collect dust particles and the like electrified by the electrification apparatus 100 and remove dust particles and the like from the air.

The electrification apparatus 100 includes the conductive microfiber 120 and the conductive plate 130, which will be described later. A high voltage is applied to the conductive microfiber 120, and a ground electrode is applied to the conductive plate 130.

Accordingly, the electrification apparatus 100 generates ions in the air to form an electric field. At this time, it is understood that the conductive plate 130 generates a potential difference with the conductive microfiber 120 to form an electric field. In addition, electrified particles can be collected on the conductive plate 130.

The collector 200 may be made of various materials collecting the electrified particles by the electrification apparatus 100. For example, the collector 200 may be a porous fiber filter such as a nonwoven fabric. The surface of the collector 200 may be applied, coated or attached with a conductive material. Then, a predetermined current is applied to the collector 200, so that the electrified dust particles and the like can be collected.

In summary, dust particles or the like in the air passing through the electric dust collection assembly 10 are coupled with the ions generated in the electrification apparatus 100 and are electrified. The electrified dust particles and the like can be collected in the electrification apparatus 100 or the collector 200.

Thus, the electrification apparatus 100 can function not only to generate ions but also to collect electrified dust particles and the like. Therefore, the electrification apparatus 100 may be referred to as a 'primary filter' and the collector 200 as a 'secondary filter'. Dust particles or the like in the air can be removed more easily as dust particles or the like in the air pass through the primary filter and the secondary filter in order.

At this time, in the electric dust collection assembly 10 according to the teachings of the present invention, the electrification apparatus 100 and the collector 200 are provided as separate devices, and thus is referred to as "assembly" in which a separate device is assembled or adjacently installed.

Specifically, the electrification apparatus 100 and the collector 200 can be produced and distributed through different manufacturing processes and distribution processes. In addition, the electrification apparatus 100 and the collector 200 may be coupled to each other by a separate coupling member or the like.

In addition, as described above, the electrification apparatus 100 can perform both the function of generating ions and the function of collecting dust particles. Accordingly, the electrification apparatus 100 may be installed as an independent product separately from the collector 200.

In other words, the electrification apparatus 100 may be installed in a general air conditioner or other products other than the air conditioner 1 for a vehicle. In addition, the electrification apparatus 100 may be installed independently.

In addition, the electrification apparatus 100 and the collector 200 may be installed in a predetermined product, respectively. For example, the electrification apparatus 100 and the collector 200 may be installed in the air conditioner 1 for a vehicle, respectively.

With reference to FIG. 1, the air conditioner 1 for a vehicle is provided with a dust collection installation portion 13 on which the electric dust collection assembly 10 is installed. Specifically, the dust collection installation portion 13 is formed in the suction main body 11 adjacent to the suction port 20. Particularly, the dust collection installation portion 13 is disposed at the lower side in the flow direction of the air flowing into the suction port 20.

This is because the air flowing into the suction port 20 is firstly passed through the electric dust collection assembly 10. In summary, the air flowing into the air conditioner 1 for a vehicle passes through the electric dust collection assembly 10 first, and dust particles and the like can be removed. Accordingly, it is possible to prevent foreign matters from adhering to the fan, the heat exchanger, and the like.

In addition, the air conditioner 1 for a vehicle is provided with a fan installation portion 12 on which the fan is installed. Specifically, the fan installation portion 12 is formed in the suction main body 11 adjacent to the suction port 20. Particularly, the fan installation portion 12 is disposed below the flow direction of air in the dust collection installation portion 13.

Therefore, in the suction main body 11, the suction port 20, the dust collection installation portion 13, and the fan mounting unit 12 are disposed in order in the air flow direction. Accordingly, the air flowing into the suction port 20 passes through the electric dust collection assembly 10 and the fan in order and flows into the discharge main body 15.

At this time, the electrification apparatus 100 and the collector 200 may be installed in the dust collection installation portion 13, respectively. Particularly, the collector 200 is disposed below in the flow direction of air in the electrification apparatus. Accordingly, the air flowing into the suction port 20 can pass through the electrification apparatus 100 and the collector 200 in order.

The electrification apparatus 100 may be installed in the dust collection installation portion 13 in a state where the collector 200 is seated. In other words, the electrification apparatus 100 and the collector 200 may be overlapped and seated on the dust collection installation portion 13.

In addition, a portion for fixing the electrification apparatus 100 may be formed on the inside of the dust collection installation portion 13. Accordingly, the electrification apparatus 100 may be installed in the dust collection installation portion 13, and the collector 200 may be installed in the lower portion of the electrification apparatus 100.

As described above, the electrification apparatus 100 and the collector 200 can be managed, respectively, since the electrification apparatus 100 and the collector 200 are installed, respectively. For example, the user can separate, replace, and clean the collector 200 only in the air conditioner 1 for a vehicle.

In particular, the replacement cycles of the electrification apparatus 100 and the collector 200 may be different from each other. Generally, since a larger amount of dust particles are collected in the collector 200, the replacement cycle of the collector 200 can be shorter than that of the electrification apparatus 100. Therefore, the user can replace only the collector 200 without the need to separate the electrification apparatus 100.

Hereinafter, the electrification apparatus 100 will be described in detail.

Figure 2:
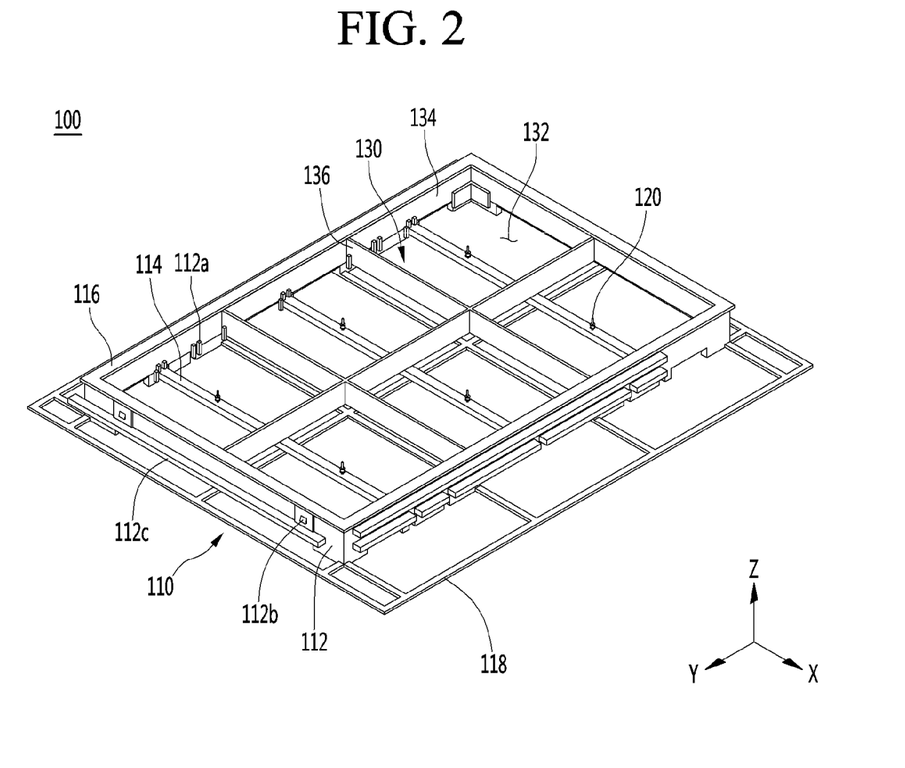
FIGS. 2 and 3 are views illustrating the electrification apparatus for an electric dust collection of the air conditioner for a vehicle according to the first embodiment of the present invention.
Figure 3:
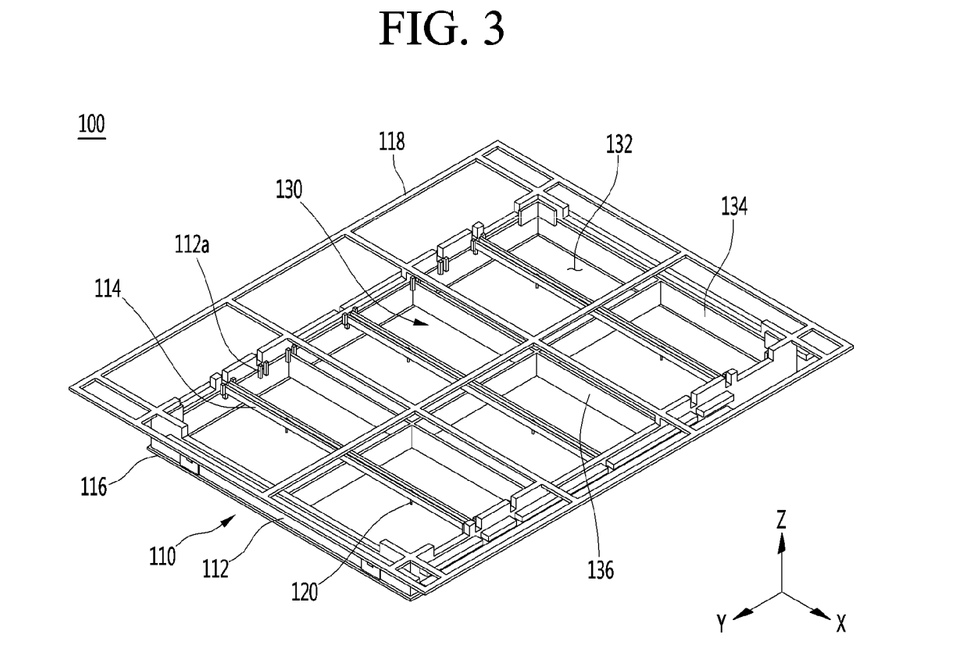
Figure 4:
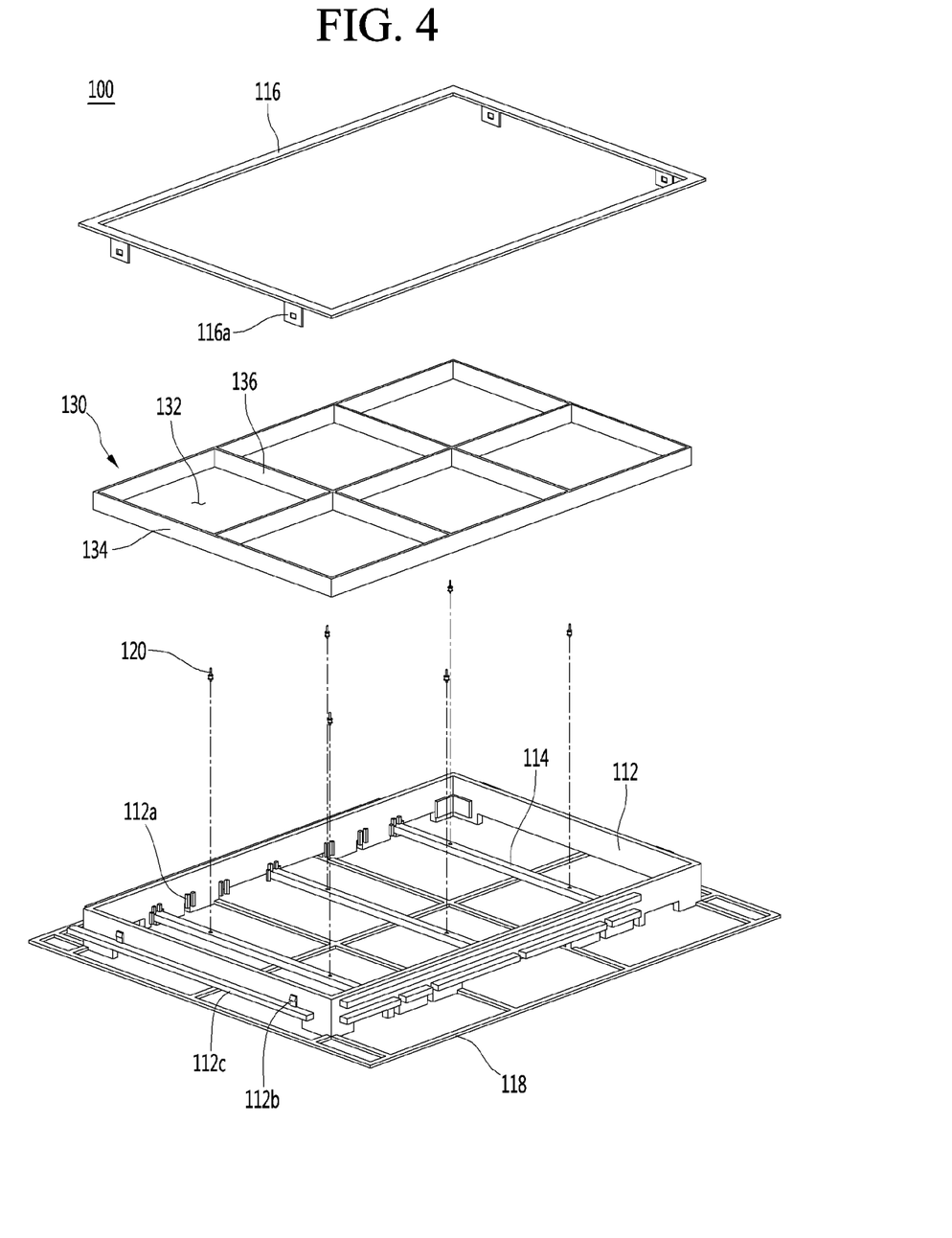
FIG. 4 is an exploded view illustrating the electrification apparatus for electric dust collection of the air conditioner for a vehicle according to the first embodiment of the present invention.

FIGS. 2 and 3 are views illustrating an electrification apparatus for electric dust collection according to the first embodiment of the present invention, and FIG. 4 is an exploded view illustrating the electrification apparatus for electric dust collection according to the first embodiment of the present invention.

FIG. 2 is a front perspective view of the electrification apparatus 100, and FIG. 3 is a rear perspective view of the electrification apparatus 100. In addition, FIG. 4 is a front perspective view of the electrification apparatus 100 in which the respective components are separated.

In addition, for the convenience of explanation, FIGS. 2 to 4 illustrate X, Y, and Z axes perpendicular to each other. In this case, the X, Y, and Z axes are illustrated to illustrate the relationship between each other, and the (+) and (−) directions of each axis are not distinguished.

As illustrated in FIGS. 2 to 4, the electrification apparatus 100 includes a frame 110 which forms an outer appearance, conductive microfiber 120 which is provided on the frame 110, and a conductive plate 130.

The frame 110 is understood as a configuration for disposing and fixing the conductive microfiber 120 and the conductive plate 130 at predetermined positions. In addition, the frame 110 may be mounted in a space in which the electrification apparatus 100 is installed, for example, the dust collection installation portion 13 of the air conditioner 1 for a vehicle described above.

In addition, the frame 110 is made of a nonconductive material and may be formed of, for example, plastic. In addition, the frame 110 may be formed in various shapes through an injection process or the like.

The conductive microfiber 120 is understood as a configuration which is discharged by a high voltage to ionize molecules in the air. For example, the conductive microfiber 120 can generate anions such as OH−, O−, and the like, or cations such as H+ in the air.

The conductive microfiber 120 is connected to electric wires for applying a high voltage but are omitted in FIGS. 2 to 4 for the sake of convenience. In addition, the conductive microfiber 120 may be understood as one end portion of an electric wire to which a high voltage is applied.

In addition, the conductive microfiber 120 include carbon fibers. The carbon fibers are formed into microfibers having a diameter in the micrometer unit. When a high voltage is applied to the carbon fibers, ions are generated in the air by corona discharge.

At this time, the conductive microfiber 120 is provided in the form of a carbon brush in which hundreds or thousands of carbon fibers form one bundle. Hereinafter, one conductive microfiber 120 means one carbon brush.

In addition, the conductive microfiber 120 is disposed on the frame 110 so as to extend in the Z-axis direction. At this time, the Z-axis may correspond to an axis extending in the air flow direction. In summary, the conductive microfiber 120 may be disposed on the frame 110 in parallel with the flow direction of the air.

It is understood that the conductive plate 130 forms an electric field with the conductive microfiber 120. In addition, a ground electric wire to which a ground electrode is applied is connected to the conductive plate 130. Accordingly, between the conductive plate 130 and the conductive microfiber 120, a potential difference is generated and an electric field can be formed.

In addition, electrons can be moved to the ground electrode. Accordingly, high-density ions can be generated between the conductive microfiber 120 and the conductive plate 130. In addition, the electrification efficiency of dust particles and the like can be improved due to the electric field formed between the conductive microfiber 120 and the conductive plate 130.

In addition, the conductive plate 130 is formed of a conductive material such as metal. Accordingly, the conductive plate 130 can be understood as a metal plate having a predetermined thickness.

In addition, since the conductive plate 130 is provided as a flat plate having a predetermined area along the Z-axis, predetermined dust particles and the like can be collected. In other words, the electrified dust particles and the like can be collected in the conductive plate 130. Therefore, the electrification apparatus 100 can also perform a function of collecting the electrified dust particles and the like.

In addition, the conductive plate 130 is disposed to surround the conductive microfiber 120. Specifically, the conductive plate 130 forms a predetermined space to surround the conductive microfiber 120.

Hereinafter, the space formed by the conductive plate 130 is referred to as an electrification space 132. At this time, the electrification space 132 means space closed in the X-Y-axis direction by the conductive plate 130 and opened in the Z-axis direction.

In particular, the conductive plate 130 according to the teachings of the present invention forms a square columnar space.

Specifically, the electrification space 132 has a rectangular shape on a plane, and a rectangular columnar space extending in the Z-axis can be formed. At this time, the rectangular shape formed on the X-Y plane may correspond to a square. In other words, the electrification space 132 can be understood as a square columnar space.

The conductive microfiber 120 is positioned at the center of the electrification space 132. Specifically, the conductive microfiber 120 is positioned at the center of the electrification space 132 on the X-Y plane and extend in the Z-axis.

At this time, the electrification space 132 refers to a space formed to surround one conductive microfiber 120. Therefore, the electrification space 132 may be formed corresponding to the number of the conductive microfibers 120.

In summary, the conductive plate 130 forms a rectangular cross-section perpendicular to the flow direction of air. The conductive microfiber 120 is positioned at the center of a rectangular cross-section.

The electrification apparatus 100 may include a plurality of conductive microfibers 120. The conductive plate 130 may form a plurality of electrification spaces 132 corresponding to the plurality of conductive microfibers 120.

The plurality of conductive microfibers 120 are disposed apart from each other in the X-Y plane. In addition, each of the conductive microfibers 120 may be disposed at the same interval as the neighboring conductive microfibers 120. In addition, the plurality of conductive microfibers 120 may be arranged in parallel with the adjacent conductive microfibers 120 along the X-axis or the Y-axis. For example, as illustrated in FIGS. 2 to 4, six conductive microfibers 120 can be provided.

The plurality of electrification spaces 132 are formed on the X-Y plane in a state of being separated from each other so as to correspond to the plurality of conductive microfibers 120. The conductive plate 130 includes an outer plate 134 for forming the plurality of electrification spaces 132 and an inner plate 136 for separating the plurality of electrification spaces 132.

The outer plate 134 can be understood as a configuration that forms an outer appearance of the conductive plate 130. Specifically, the outer plate 134 may be provided in a rectangular frame shape.

The outer plate 134 forms a space in which the plurality of electrification spaces 132 are combined. Specifically, the outer plate 134 has a rectangular shape in the X-Y plane and forms a rectangular columnar space extending in the Z-axis.

The inner plate 136 may be understood as a configuration that divides the space formed by the outer plate 134 into the electrification spaces 132. Accordingly, both ends of the inner plate 136 can be connected to the outer plate 134. In particular, the inner plate 136 extends in the X-axis or the Y-axis. For example, the inner plate 136 may divide the space formed by the outer plate 134 into six electrification spaces 132.

At this time, the outer plate 134 and the inner plate 136 may be integrally formed with each other. Alternatively, the outer plate 134 and the inner plate 136 may be separately fabricated and coupled with each other.

In the electrification apparatus of the related art, the electrification space is formed into a cylindrical shape around the conductive microfiber. Thereby, air cannot flow between the electrification spaces, or a death zone can be formed which cannot be electrified.

However, in a case where the electrification space is formed into a square columnar shape as in the present invention, there is no dead space between the electrification spaces. Therefore, the electrification space per the same space can be maximized. Accordingly, the flow rate of the air passing through the electrification space can be maximized.

The frame 110 includes a main body frame 112 on which the conductive plate 130 is installed and an installation frame 114 on which the conductive microfiber 120 is installed.

The main body frame 112 can be understood as a configuration that forms an outer appearance of the frame 110. In addition, the outer plate 134 may be fitted to the main body frame 112. Accordingly, the main body frame 112 is provided in a shape corresponding to the outer plate 134.

Therefore, the main body frame 112 is provided in a rectangular frame shape as in the outer plate 134. Specifically, the outer plate 134 is installed on the main body frame 112 such that the outer surface of the outer plate 134 is in contact with the inner surface of the main body frame 112.

In addition, the main body frame 112 is provided with a plurality of fixing protrusions 112a which are in contact with the inner surface of the outer plate 134. In addition, the outer plate 134 may be fixed to the main body frame 112 by means of a bonding member such as a bond.

In addition, the frame 110 further includes a cover frame 116 coupled to an upper end of the main body frame 112. The cover frame 116 may be coupled to the main body frame 112 to cover the upper end of the outer plate 134. In other words, the outer plate 134 may be fixed in the Z-axis by coupling of the main body frame 112 and the cover frame 116.

The cover frame 116 and the main body frame 112 can be hooked. For example, the main body frame 112 may have a hook 112b protruding outwardly, and the cover frame 116 may be formed with a hook groove 116a into which the hook 112b is inserted.

In addition, the main body frame 112 is formed with a frame installation protrusion 112c protruding outwardly and extending along the main body frame 112. The frame installation protrusion 112c may correspond to a portion which is seated in a product on which the electrification apparatus 100 is installed.

For example, protrusions on which the frame installation protrusion 112c is seated may be formed on the inside of the dust collection installation portion 13. Therefore, the electrification apparatus 100 may be installed in the dust collection installation portion 13 such that the frame installation protrusion 112c is seated on the protrusion.

In addition, the frame installation protrusion 112c may be formed on the outer surface of the main body frame 112. In other words, the frame installation protrusion 112c may be formed on all four surfaces forming the main body frame 112. Accordingly, the electrification apparatus 100 can be installed by the frame installation protrusion 112c irrespective of the direction in which the electrification apparatus 100 is installed in the product.

For example, the main body frame 112 or the conductive plate 130 is formed as a rectangular frame having a long surface and a short surface. With reference to FIG. 1, the electrification apparatus 100 is inserted into the dust collection installation portion 13 such that end surface of the electrification apparatus 100 is disposed on both sides of the dust collection installation portion 13. Accordingly, the frame installation protrusion 112c formed on the end surface of the main body frame 112 can be seated on the inner surface of the dust collection installation portion 13.

The installation frame 114 is installed in an inside of the main body frame 112 in a state of extending into one side. In other words, both ends of the installation frame 114 are fixed to the main body frame 112. In the installation frame 114, a fixing groove 114a into which the conductive microfiber 120 are inserted is formed. At this time, the fixing grooves 114a are formed to correspond to the number of the conductive microfibers 120.

In addition, the frame 110 may further include an auxiliary frame 118. The auxiliary frame 118 can be understood as a configuration that maintains the rigidity of the frame 110. In other words, the auxiliary frame 118 corresponds to a configuration for preventing the main body frame 112 and the installation frame 114 from being deformed. Accordingly, the auxiliary frame 118 may have various shapes according to the design and may be omitted.

As described above, the frame 110 may be formed by an injection process. Accordingly, although the frame 110 has been described in detail, the frame 110 may be integrally formed.

Hereinafter, another embodiment of the air conditioner for a vehicle 1 will be described. At this time, the same reference numerals are used for the same components as those described above, and a description thereof is referred.

Figure 5:
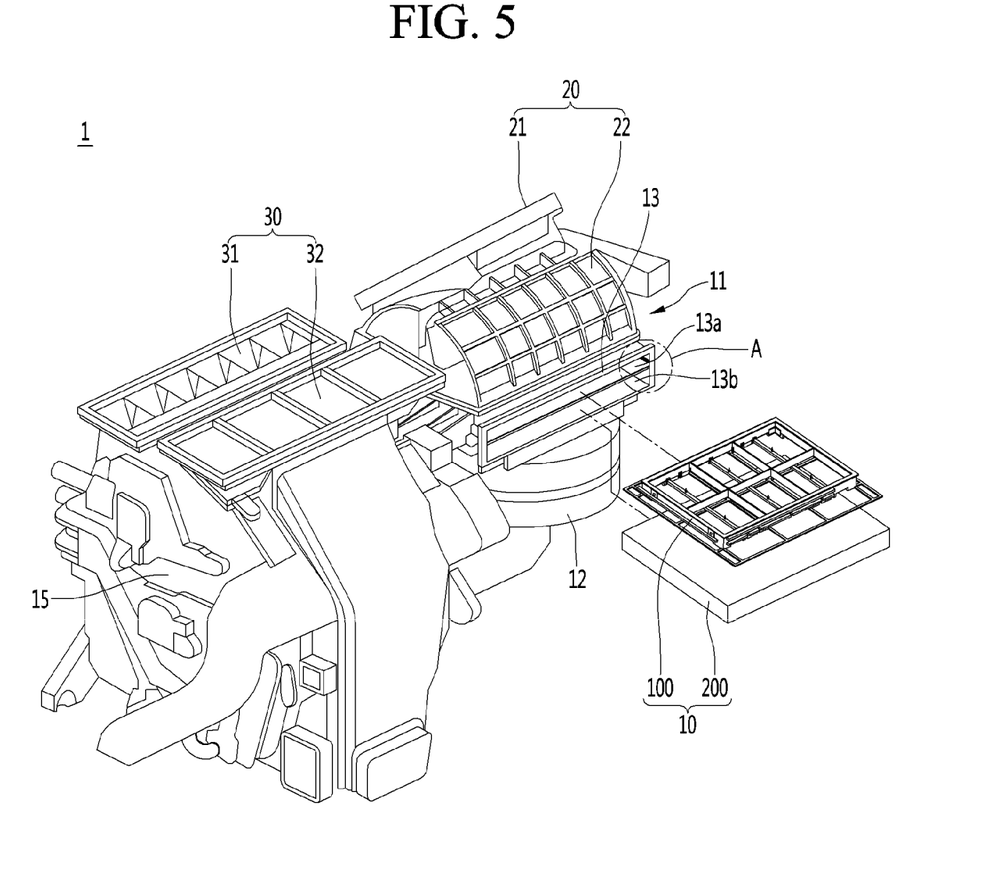
FIG. 5 is a view illustrating an air conditioner for a vehicle according to a second embodiment of the present invention and an electric dust collection assembly installed therein.
Figure 6:
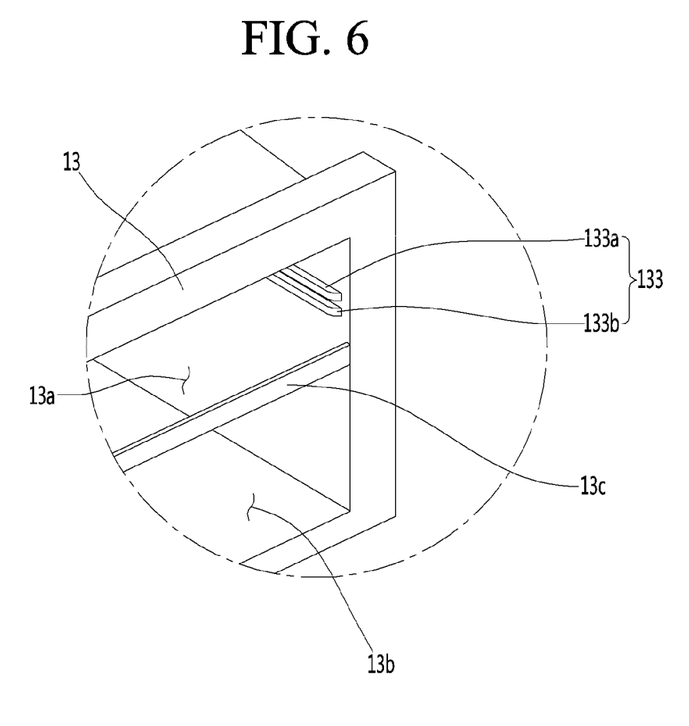
FIG. 6 is an enlarged view of a portion A in FIG. 5.

FIG. 5 is a view illustrating an air conditioner for a vehicle according to a second embodiment of the present invention and an electric dust collection assembly installed therein, and FIG. 6 is an enlarged view of a portion A of FIG. 5.

As illustrated in FIGS. 5 and 6, the electric dust collection assembly 10 is installed in the air conditioner 1 for a vehicle according to the teachings of the present invention. Specifically, the electric dust collection assembly 10 is disposed in a suction main body 11 having the suction port 20 and the fan installation portion 12 formed therein.

The suction main body 11 is provided with a dust collection installation portion 13 on which the electric dust collection assembly 10 is installed. The dust collection installation portion 13 includes a first installation hole 13a into which the electrification apparatus 100 is inserted and a second installation hole 13b into which the collector 200 is inserted.

The first installation hole 13a and the second installation hole 13b are understood as openings formed on one side of the dust collection installation portion 13. Therefore, the electrification apparatus 100 and the collector 200 can be installed in the dust collection installation portion 13 or can be separated from the dust collection installation portion 13 through different openings.

Accordingly, the user can manage the electrification apparatus 100 and the collector 200 more conveniently. For example, in a case where the electrification apparatus 100 is to be cleaned, only the electrification apparatus 100 can be separated from the dust collection installation portion 13 through the first installation hole 13a.

At this time, the dust collection installation portion 13 may further include a partition 13c that separates the first and second installation holes 13a and 13b from each other. The partition 13c is provided so as to separate only the open side of the dust collection installation portion 13. In other words, the internal space of the dust collection installation portion 13 is not separated, and air can smoothly flow.

Therefore, it is understood that the electrification apparatus 100 and the collector 200 are provided in the dust collection installation portion 13 through different openings from each other but are communicated with each other inside the dust collection installation portion 13.

Generally, the collector 200 may have a larger area than the electrification apparatus 100. Accordingly, in FIGS. 5 and 6, the second installation hole 13b is illustrated larger than the first installation hole 13a. However, it is an example and is not limited thereto.

As illustrated in FIGS. 5 and 6, the first installation hole 13a is positioned above the second installation portion 13b. In other words, the electrification apparatus 100 is positioned above the collector 200. This disposition is because the flow direction of the air in the dust collection installation portion 13 is generated from the upper portion to the lower portion thereof.

Specifically, the suction port 20 is positioned above the dust collection installation portion 13 and the fan mounting unit 12 is positioned below the dust collection installation portion 13. Accordingly, the flow of the air is generated from the upper portion to the lower portion, and the air introduced into the suction port 20 passes through the dust collection installation portion 13 from the upper portion to the lower portion thereof.

The collector 200 corresponds to a device for collecting dust particles or the like electrified in the electrification apparatus 100. Therefore, the electrification apparatus 100 is positioned in the upper portion of the collector 200 in the flow direction of the air. Accordingly, the electrification apparatus 100 may be positioned above the collector 200.

In addition, as the position of the suction port 20 or the fan installation portion 12 is changed, the flow direction of the air passing through the dust collection installation portion 13 can be changed. Accordingly, the disposition of the first installation hole 13a and the second installation hole 13b can be changed.

For example, in a case where the suction port 20 is positioned on the right side and the fan installation portion 12 is positioned on the left side, the air passing through the dust collection installation portion 13 flows from right side to left side. Accordingly, the first installation hole 13a may be disposed on the right side of the second installation hole 13b.

The collector 200 is installed in the dust collection installation portion 13. In addition, one end surface of the collector 200 may have a size corresponding to the second installation hole 13b.

The electrification apparatus 100 is positioned above the collector 200 and is installed in the dust collection installation portion 13. At this time, the electrification apparatus 100 may be installed in the dust collection installation portion 13 in various forms.

For example, the electrification apparatus 100 may be seated on the upper portion of the collector 200. In other words, the electrification apparatus 100 can be installed in the dust collection installation portion 13 by overlapping with the collecting apparatus 200. Accordingly, the electrification apparatus 100 and the collector 200 are drawn out through separate openings but are stacked in the dust collection installation portion 13.

In addition, the electrification apparatus 100 may be installed at the dust collection installation portion 13 at a predetermined distance from the collector 200. In other words, the electrification apparatus 100 is seated on the dust collection installation portion 13 separately from the collector 200.

For example, a sliding protrusion 133 protruding inward is formed on the inner wall of the dust collection installation portion 13. The sliding protrusion 133 extends from one side of the dust collection installation portion 13 to the inside thereof.

In particular, the sliding protrusion 133 may extend inward from the first installation hole 13a. The sliding protrusions 133 may be formed on both side surfaces of the dust collecting and mounting unit 13.

At this time, the electrification apparatus 100 may be seated on the sliding protrusion 133. Specifically, the electrification apparatus 100 is provided with a main body frame 112 having a frame installation protrusion 112c protruding outwardly. At this time, the frame installation protrusion 112c may be seated on the sliding protrusion 133.

In addition, the sliding protrusion 133 may include a first protrusion 133a and a second protrusion 133b which are vertically spaced apart from each other. With Reference to FIG. 6, the first protrusion 133a and the second protrusion 133b extend inward from the first installation hole 13a. The frame installation protrusion 112c may be seated between the first protrusion 133a and the second protrusion 133b.

In summary, the electrification apparatus 100 is inserted into the first installation hole 13a such that the frame installation protrusion 112c is disposed between the first protrusion 133a and the second protrusion 133b. When the electrification apparatus 100 is pushed into the dust collection installation portion 13, the frame installation protrusion 112c slides along the first protrusion 133a and the second protrusion 133b. In other words, the electrification apparatus 100 may be slidingly coupled to the dust collection installation portion 13.

At this time, the electrification apparatus 100 may be additionally provided with a handle capable of being held by a user. In addition, the auxiliary frame 118 may function as the handle. Accordingly, the user can grip the grip portion and install the electrification apparatus 100 on the dust collection installation portion 13.

In addition, the dust collection installation portion 13 may be provided with a device for lifting the electrification apparatus 100. Therefore, the electrification apparatus 100 can be fixed to the upper portion of the collector 200. For example, the dust collection installation portion 13 may be provided with an elastic portion for supporting the electrification apparatus 100.

In addition, in a case where the electrification apparatus 100 is separated from the dust collection installation portion 13, the electrification apparatus 100 may be driven to turn off the power source. In other words, when the electrification apparatus 100 is separated from the dust collection installation portion 13, the external power source can be blocked by the ON/OFF switch. In addition, a button for blocking the power source may be provided on one side of the dust collection installation portion 13. This can be understood to be for the safety and the convenience of the user.

In addition, the conductive wire extending from the conductive microfiber 120 and the ground electric wire extending from the conductive plate 130 may be connected to external power source or ground by a connector. Therefore, by separating the connector, the electrification apparatus 100 can be easily taken out from the dust collection installation portion 13.

Figure 7:
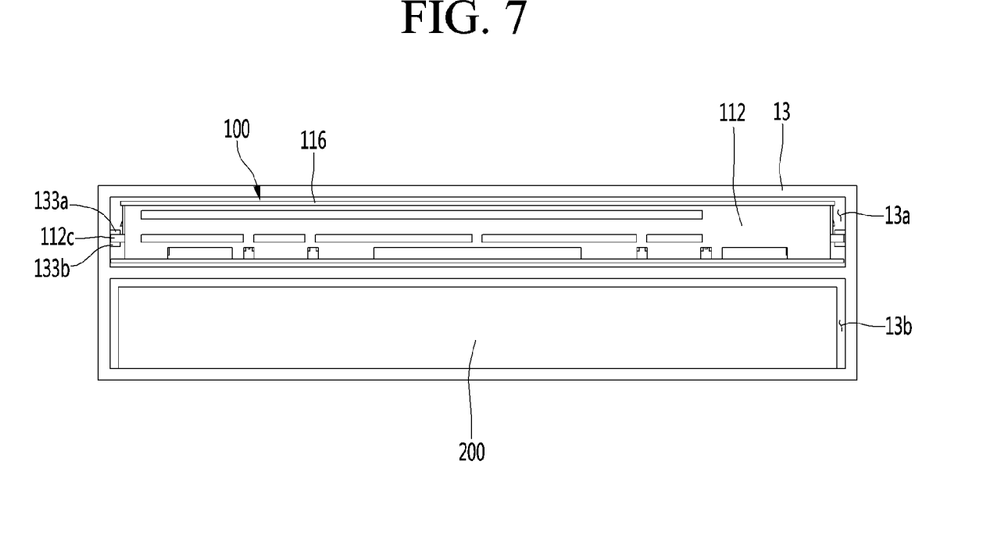
FIG. 7 is a view illustrating the air conditioner for a vehicle and the electric dust collection assembly installed therein according to the second embodiment of the present invention.

FIG. 7 is a view illustrating an air conditioner for a vehicle and an electric dust collection assembly installed therein according to a second embodiment of the present invention.

FIG. 7 illustrates a state where the electric dust collection assembly 10 is installed on the dust collection installation portion 13 from the front. The configuration of the air conditioner for a vehicle 1 except for the dust collection installation portion 13 is omitted, for the convenience of illustration.

As illustrated in FIG. 7, the electrification apparatus 100 is installed through the first installation hole 13a, and the collector 200 is installed through the second installation hole 13b. As described above, the first installation hole 13a is positioned above the second installation hole 13b. In addition, the electrification apparatus 100 is positioned above the collector 200.

In addition, the first installation hole 13a and the second installation hole 13b are vertically divided by the partition 13c. In other words, the partition 13c extends perpendicular to the direction of air flow. Accordingly, the first installation hole 13a and the second installation hole 13b can be disposed in order in the air flow direction.

In addition, the inside of the dust collection installation portion 13 is provided to be communicated. In other words, the partition 13c is not extended to the inside of the dust collection installation portion 13. Accordingly, the air can sequentially pass through the electrification apparatus 100 installed in the first installation hole 13a and the collector 200 installed in the second installation hole 13b.

The collector 200 is seated on the lower surface of the dust collection installation portion 13. Specifically, the fan installation portion 12 is provided at a lower portion of the dust collection installation portion 13, and a plurality of openings through which air flows are formed at a lower surface of the dust collection installation portion 13. The collector 200 may be formed larger than the opening and may be seated on the lower surface of the dust collection installation portion 13.

The electrification apparatus 100 is positioned on the upper portion of the collector 200 and is seated on the dust collection installation portion 13. Specifically, the electrification apparatus 100 can be seated on both sides of the dust collection installation portion 13.

As illustrated in FIG. 7, the sliding protrusions 133 including the first protrusions 133a and the second protrusions 133b are provided on both side surfaces of the dust collection installation portion 13. The frame installation protrusion 112c of the electrification apparatus 100 is seated between the first protrusion 133a and the second protrusion 133b.

Specifically, the frame installation protrusion 122c is slidably coupled between the first protrusion 133a and the second protrusion 133b. In particular, the frame installation protrusion 112c is seated on the second protrusion 133b. The first protrusion 133a is positioned above the frame installation protrusion 112c. Therefore, it is possible to prevent the electrification apparatus 100 from being separated due to vibration or external impact.

Through such a structure, the electrification apparatus 100 can be stably installed in the dust collection installation portion 13. In addition, since the electrification apparatus 100 and the collector 200 are disposed apart from each other, each device can be easily separated. For example, the electrification apparatus 100 can be installed in the dust collection installation portion 13 or can be separated from the dust collection installation portion 13 irrespective of the collector 200.

As a result, the electric dust collection assembly of the air conditioner for a vehicle according to the teachings of the present invention divides the electrification apparatus and the collector into separate devices. Accordingly, each device can be more easily managed, and each device can be separately managed.

DESCRIPTION OF REFERENCE NUMERALS

1: air conditioner for vehicle
10: electric dust collection assembly
11: suction main body
13: dust collection installation portion
100: electrification apparatus (for electric dust collection)
110: frame
112: main body frame
112c: frame installation protrusion
120: conductive microfiber
130: conductive plate
200: collector (for electric dust collection)

What is claimed is:

1. An air conditioner for a vehicle, the air conditioner comprising:
a main body that defines a suction port and a discharge port; and
an electric dust collection assembly disposed inside the main body and configured to remove dust particles from air introduced into the suction port,
wherein the electric dust collection assembly comprises:
an electrification apparatus configured to electrify the dust particles in the air, and
a collector configured to collect the dust particles electrified by the electrification apparatus and to remove the dust particles from the air,
wherein the main body comprises a dust collection installation portion that is configured to receive the electric dust collection assembly and that is configured to slidably couple to the electrification apparatus,
wherein the electrification apparatus and the collector are configured to be installed in the dust collection installation portion and to be taken out from the dust collection installation portion,
wherein the dust collection installation portion comprises a sliding protrusion that extends along an inner wall of the dust collection installation portion and that protrudes inward from the inner wall, and
wherein the electrification apparatus comprises a frame installation protrusion that extends linearly along a side surface of the electrification apparatus, that protrudes outward from the side surface of the electrification apparatus, and that is configured to be seated on the sliding protrusion.

2. The air conditioner according to claim 1,
wherein the electrification apparatus is installed in the dust collection installation portion so as to be closer to the suction port than the collector.

3. The air conditioner according to claim 1,
wherein the electrification apparatus and the collector are installed in the dust collection installation portion in a state of being spaced apart from each other.

4. The air conditioner according to claim 1,
wherein the sliding protrusion includes a first protrusion and a second protrusion spaced apart from each other, and wherein the frame installation protrusion is seated between the first protrusion and the second protrusion.

5. The air conditioner according to claim 1, wherein the electrification apparatus includes:
   a frame that defines an outer appearance of the electrification apparatus;
   a conductive microfiber installed in the frame and configured to generate ions in the air; and
   a conductive plate installed in the frame and configured to generate a potential difference with the conductive microfiber.

6. The air conditioner according to claim 5, wherein the conductive plate is disposed so as to surround the conductive microfiber to form an electrification space in which an electric field is generated, and
wherein the electrification space is a rectangular columnar shaped space.

7. The air conditioner according to claim 5, wherein the conductive microfiber include a carbon brush formed of a bundle of carbon fibers.

8. The air conditioner according to claim 5, wherein the frame includes:
   a main body frame in which the conductive plate is installed; and
   an installation frame extending to the inside of the main body frame and in which the conductive microfiber is installed.

9. The air conditioner according to claim 1, wherein the electrification apparatus and the collector are configured to be separated from each other.

10. The air conditioner according to claim 1, wherein the sliding protrusion includes a first protrusion and a second protrusion that are vertically spaced apart from each other and that extend along the inner wall, and
   wherein the frame installation protrusion is configured to insert between the first protrusion and the second protrusion.

11. The air conditioner according to claim 1, wherein the main body further comprises a partition that separates the dust collection installation portion into a first installation hole configured to receive the electrification apparatus and a second installation hole configured to receive the collector.

12. The air conditioner according to claim 11, wherein the first installation hole is defined vertically above the second installation hole, and the sliding protrusion is disposed in the first installation hole.

13. An air conditioner for a vehicle, the air conditioner comprising:
   a main body that defines a suction port and a discharge port; and
   an electric dust collection assembly configured to be installed inside the main body and to remove dust particles from air introduced into the suction port,
wherein the electric dust collection assembly comprises:
   an electrification apparatus configured to electrify the dust particles in the air, and
   a collector configured to collect the dust particles electrified by the electrification apparatus and to remove the dust particles from the air,
wherein the main body comprises a dust collection installation portion that defines a first installation hole configured to receive the electrification apparatus, that defines a second installation hole configured to receive the collector, and that is configured to slidably couple to the electrification apparatus,
wherein the dust collection installation portion comprises a sliding protrusion that extends along an inner wall of the first installation hole and that protrudes inward from the inner wall, and
wherein the electrification apparatus comprises a frame installation protrusion that extends linearly along a side surface of the electrification apparatus, that protrudes outward from the side surface of the electrification apparatus, and that is configured to be seated on the sliding protrusion.

14. The air conditioner according to claim 13, wherein the dust collection installation portion further includes a partition that separates the first installation hole and the second installation hole.

15. The air conditioner according to claim 13, wherein the dust collection installation portion has one side that defines the first installation hole and the second installation hole, the dust collection installation portion having an internal space in which the electrification apparatus and the collector are installed.

16. The air conditioner according to claim 13, wherein the first installation hole is positioned closer to the suction port than the second installation hole.

17. The air conditioner according to claim 13, wherein the sliding protrusion includes a first protrusion and a second protrusion that are vertically spaced apart from each other and that extend along the inner wall of the first installation hole and protrude inwardly.

18. The air conditioner according to claim 17, wherein the frame installation protrusion is positioned between the first protrusion and the second protrusion.

* * * * *